June 25, 1935.  A. C. WILCOX  2,005,763
AUTOMATIC THERMOSTATIC SWITCH PLUG
Filed July 20, 1932
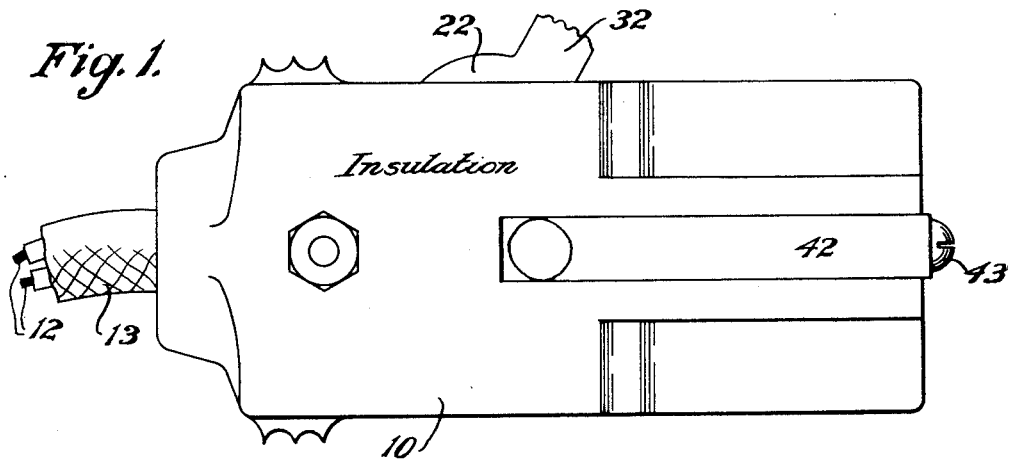
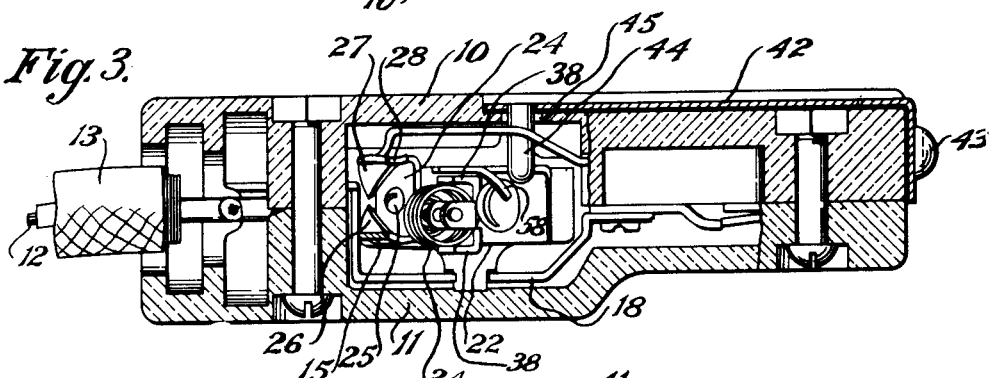
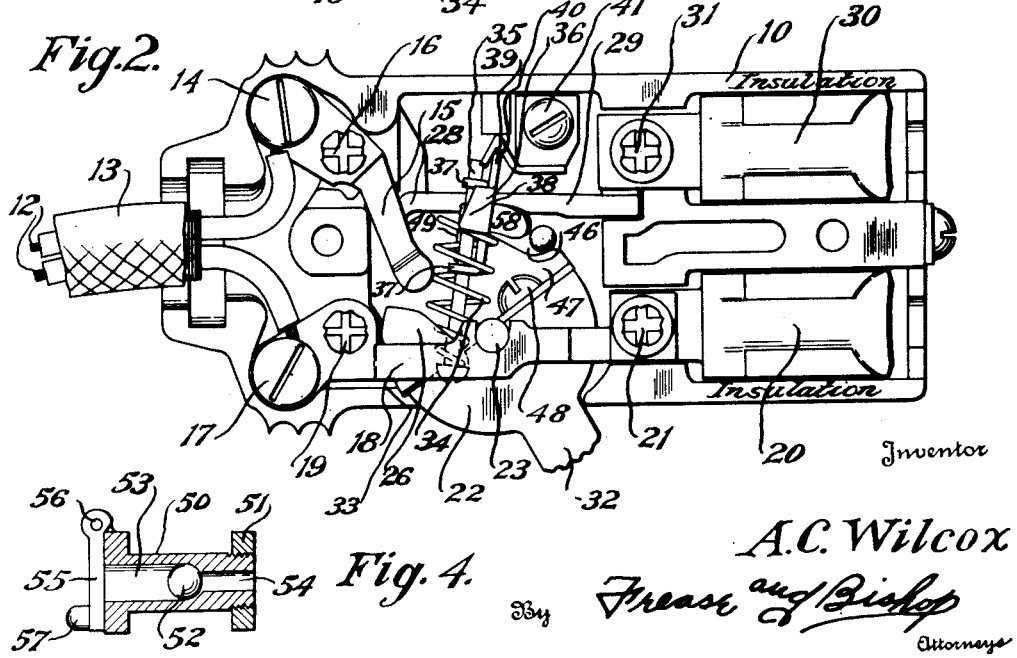
Inventor
A. C. Wilcox
By Frease and Bishop
Attorneys Patented June 25, 1935

2,005,763

UNITED STATES PATENT OFFICE 2,005,763

AUTOMATIC THERMOSTATIC SWITCH PLUG

Albert C. Wilcox, Massillon, Ohio, assignor to The Enterprise Aluminum Company, Massillon, Ohio, a corporation of Ohio Application July 20, 1932, Serial No. 623,561

2 Claims. (Cl. 200—138)

The invention relates to switch plugs and more particularly to an automatic thermostatic switch especially adapted for use in connection with electrically operated cooking utensils.

The conventional type of thermostatic electric cut-outs or switches have been found impractical for use in connection with certain types of household cooking utensils such for instance as electric drip coffee makers and similar devices in which it is desirable to cut off the current and release the water from the container in which it is heated when the water reaches the boiling point.

With such utensils, the current being cut off and the water drained from the heating container, the temperature of the container would drop and the thermostat would again become active and turn on the current. With no water remaining in the container, the heating element would burn out the bottom of the container and eventually destroy the heating unit unless the switch were manually detached from the utensil.

The object of the present improvement is to provide an automatic thermostatic switch plug which must be manually turned on or to the closed position and which will operate automatically to cut off the current at the desired temperature and will remain cut off until again manually closed, thus preventing damage to the cooking utensil, as above described.

Another object is to provide a thermostatic switch provided with means for normally urging the same toward the open position, a bimetal strip being provided for holding the switch in closed position until acted upon by heat or escaping steam to permit the switch opening means to operate.

A further object of the improvement is to provide a switch plug having a movable blade with a spring for normally urging the switch blade to open position, a bimetal strip being provided with a stop or lock pin adapted to engage the switch blade, when the same is manually moved to closed position, and hold the switch blade against movement by the spring until the bimetal strip is warped by the action of heat or steam thereon to withdraw the lock pin from engagement with the switch blade and permit the spring to throw the switch blade to the open position.

The above objects, together with others which will be apparent from the drawing and the following description, may be attained by constructing the improved switch plug in the manner illustrated in the accompanying drawing, in which Figure 1 is a plan view of the improved switch plug;

Fig. 2, a plan view of the switch plug, looking at the opposite side, with one half of the insulation shell removed for the purpose of illustrating the working parts within the switch plug;

Fig. 3, a longitudinal sectional view of the switch plug; and

Fig. 4, a longitudinal sectional view through a bleeder port which may be used in connection with the improved switch plug for directing a jet of steam upon the bimetal strip to automatically open the switch.

Similar numerals refer to similar parts throughout the drawing.

The switch plug may be enclosed within the separable shell members 10 and 11 formed of suitable insulation material and of any usual or desirable form.

The usual lead-in wires, adapted to be connected to an electric circuit in usual and well known manner, are indicated at 12 and are adapted to be enclosed within an insulation housing 13 as is customary in devices of this kind. One of the wires 12 leads to a binding screw 14 upon the switch contact 15 which may be fixed to the insulation shell section 11 as by a rivet 16 and is adapted to be engaged by the movable switch blade, as will be later described.

The other wire 12 is connected to a binding screw 17 mounted upon a bus bar 18 which is fixed to the insulation shell 11 as by the rivet 19 and to the plug contact 20, for attachment to one of the usual terminal posts upon the utensil to be operated, as by a rivet 21 which may also attach the plug contact 20 to the insulation shell 11.

The switch blade may be of any usual and well known type and for the purpose of illustration a rotatable or oscillating blade is shown mounted upon an insulation segment 22 which is pivotally mounted as upon the shaft 23 which may be journaled within the insulation shells in any suitable manner.

The switch blade proper is shown generally at 24 and is connected to the insulation segment 22 as by a screw 25 and provided with the spaced angular contact portions 26 and 27 for engagement with the upper contact 15 and lower contact 28 respectively.

This lower contact 28 may be provided with a bus bar extension 29 attached to the other plug contact 30 which may be fixed to the insulation shell 11 as by the rivet 31.

The segment 22 may be provided with a handle portion 32 located through a suitable opening 33 in one side of the insulation shell for manually moving the switch blade to the closed position, and means is provided for normally urging the switch blade toward the open position such as shown in Fig. 2. This means may comprise the coil spring 34 which encircles the rod 35 which may be pivotally connected to the segment 22.

A bracket, shown generally at 36, may be slidably mounted upon the rod 35 as by the bearing portions 37 and may be provided with wings or the like 38 adapted to bear against the adjacent end of the spring 34, the opposite end of which is in contact with the segment 22 upon the side of the pivot point 23 adjacent to the switch blade 26 in order to normally urge the segment and switch blade to the opposite position illustrated in Fig. 2.

The outer end of the bracket 36, as shown at 39, is engaged by a stop clip 40 connected to one of the insulation shells as by the screw 41, in order to hold the spring 34 under compression at all times so as to normally urge the segment and switch blade toward the open position.

A bimetal strip 42 is mounted upon the outside of the insulation shell 10, as by the screw 43 which connects one end of the bimetal strip to the shell. A lock stud 44 is fixed to the free end portion of the bimetal strip and extends through an opening 45 in the adjacent wall of the shell 10 and is adapted to be normally seated in the recess 46 formed in the stop lug 47, fixed upon the opposite side of the segment 22 to the switch blade 26, as by a screw 48, when the switch is in open position, as shown in Fig. 2; or to engage the outer edge 49 of the stop lug 47 when the segment 22 is rotated to move the switch blade 26 into engagement with the contacts 15 and 28.

The bimetal strip 42 is adapted to warp outward at its free end when heat or steam contacts therewith in order to withdraw the lock pin 44 from engagement with the outer edge 49 of the lock lug 47 to permit the spring 34 to throw the segment 22 to the open position, shown in Fig. 2.

Any suitable arrangement of bleeder port or valve may be provided upon the cooking utensil, to which the switch plug is attached, for directing a jet of steam upon the bimetal strip 42. One form of such a bleeder valve is shown in Fig. 4, comprising a hollow stud 50 which may be located through a wall of the utensil and provided with a nut 51 for attaching the same.

A ball check 52 may be provided within the enlarged portion 53 of the bore 54 in said stud to prevent the valve from opening until a desired amount of steam pressure is created within the utensil. A swinging trap door 55 may be pivotally mounted as at 56 to the outer end of the stud 50 to normally close the valve and a weight 57 may, if desired, be mounted upon the swinging side of said door to retard the opening of the same until the desired steam pressure is created.

In the operation of the improved switch plug, the same is attached to the utensil to be operated in usual and ordinary manner by connecting the plug contacts 20 and 30 to the usual terminal studs upon the utensil.

The switch is then manually closed by rotating the segment 22 to bring the switch blade 26 into engagement with the contacts 15 and 28, at which time the lock stud 44, upon the bimetal strip 42, will ride over the inclined lip 58 upon the lock lug 47 and engage the outer edge 49 of said lock lug, holding the segment 22 in the closed position, against the normal urge of the spring 34.

As the desired steam pressure is created within the utensil, a jet of steam from the bleeder port or valve therein will contact with the bimetal strip 42, warping the same sufficiently to withdraw the lock stud 44 from engagement with the outer edge 49 of the lock lug 47, permitting the spring 34 to rotate the segment 22 upon its axis to withdraw the switch blade 26 from engagement with the contacts 15 and 28, breaking the circuit to the utensil and leaving the switch in the open position as shown in Fig. 2. The switch will remain in this position until again manually closed.

I claim:

1. An automatic thermostatic switch including a spaced pair of contacts, a rotatable segment, a switch member carried by said segment and arranged to simultaneously contact with both of said contacts, a spring associated with the segment and arranged to normally urge the segment in a direction to move the switch member away from said contacts, a locking lug upon the segment having a recess therein, a bimetal member, and a lock stud upon the bimetal member arranged to engage said locking lug to hold the switch member in engagement with said contacts and arranged to be received in said recess in the locking lug when the segment is rotated to a position to move the switch member away from said contacts.

2. An automatic thermostatic switch including a spaced pair of contacts, a rotatable segment, a switch member carried by said segment and arranged to simultaneously contact with both of said contacts, a spring associated with the segment and arranged to normally urge the segment in a direction to move the switch member away from said contacts, a locking lug upon the segment having a recess therein, an inclined lip upon the locking lug adjacent to said recess, a bimetal member, and a lock stud upon the bimetal member arranged to engage said locking lug to hold the switch member in engagement with said contacts and arranged to be received in said recess in the locking lug when the segment is rotated to a position to move the switch member away from said contacts.

ALBERT C. WILCOX.